United States Patent
Kozat et al.

(10) Patent No.: US 8,275,615 B2
(45) Date of Patent: Sep. 25, 2012

(54) MODEL WEIGHTING, SELECTION AND HYPOTHESES COMBINATION FOR AUTOMATIC SPEECH RECOGNITION AND MACHINE TRANSLATION

(75) Inventors: Suleyman S. Kozat, White Plains, NY (US); Ruhi Sarikaya, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/777,426

(22) Filed: Jul. 13, 2007

(65) Prior Publication Data
US 2009/0018833 A1 Jan. 15, 2009

(51) Int. Cl.
G10L 15/06 (2006.01)
G10L 15/14 (2006.01)
G06F 17/28 (2006.01)

(52) U.S. Cl. .......... 704/240; 704/244; 704/277
(58) Field of Classification Search ............ 704/2, 3, 704/236, 240, 243, 255, 277, 244; 706/12, 706/14
See application file for complete search history.

(56) References Cited

U.S. PATENT DOCUMENTS

| | | | |
|---|---|---|---|
| 5,465,317 A | | 11/1995 | Epstein |
| 5,606,644 A | * | 2/1997 | Chou et al. .......... 704/243 |
| 5,806,029 A | * | 9/1998 | Buhrke et al. .......... 704/244 |
| 6,122,613 A | * | 9/2000 | Baker .......... 704/235 |
| 6,125,345 A | * | 9/2000 | Modi et al. .......... 704/240 |
| 6,836,758 B2 | * | 12/2004 | Bi et al. .......... 704/231 |
| 6,865,531 B1 | * | 3/2005 | Huang .......... 704/226 |
| 6,898,567 B2 | * | 5/2005 | Balasuriya .......... 704/231 |
| 7,016,835 B2 | * | 3/2006 | Eide et al. .......... 704/231 |
| 7,617,103 B2 | * | 11/2009 | He et al. .......... 704/256 |
| 7,844,555 B2 | * | 11/2010 | Gao et al. .......... 706/15 |
| 2002/0165714 A1 | * | 11/2002 | Beyerlein .......... 704/243 |
| 2005/0288929 A1 | | 12/2005 | Kuboyama et al. |
| 2006/0020463 A1 | | 1/2006 | Reich |
| 2008/0147579 A1 | * | 6/2008 | Gao .......... 706/25 |
| 2008/0177686 A1 | * | 7/2008 | Buyuktosunoglu et al. ..... 706/46 |
| 2009/0063145 A1 | * | 3/2009 | Hakkani-Tur et al. .......... 704/244 |
| 2009/0327176 A1 | * | 12/2009 | Teramoto .......... 706/12 |

OTHER PUBLICATIONS

Sarikaya et al., "PCA-PMC: A Novel Use of a Priori Knowledge for Fast Parallel Model Combination", 2000 IEEE International Conference on Acoustics, Speech, and Signal Processing, Jun. 5, 2000 to Jun. 9, 2000, ICASSP '00, vol. 2, pp. II-1113 to II-1116.*
Hao et al., "Generalized Multiclass AdaBoost and Its Applications to Multimedia", Computer Vision and Pattern Recognition, 2006, Jun. 17, 2006 to Jun. 22, 2006, Six Pages.*
L. Mangu et al.; Finding Consensus Among Words: Lattice-Based Word Error Minimization; Eurospeech; 1999; 4 pages.
Jonathan G. Fiscus; A Post-Processing System to Yield Reduced Word Error Rates: Recognizer Output Voting Error Reduction; ASRU; 1997; 8 pages.

* cited by examiner

*Primary Examiner* — Martin Lerner
(74) *Attorney, Agent, or Firm* — Tutunjian & Bitetto, P.C.; Anne V. Dougherty

(57) ABSTRACT

A translation method and system include a recognition engine having a plurality of models each being employed to decode a same utterance to provide an output. A model combiner is configured to assign probabilities to each model output and configured to assign weights to the outputs of the plurality of models based on the probabilities to provide a best performing model for the context of the utterance.

20 Claims, 3 Drawing Sheets

MODEL WEIGHTING, SELECTION AND HYPOTHESES COMBINATION FOR AUTOMATIC SPEECH RECOGNITION AND MACHINE TRANSLATION

BACKGROUND

1. Technical Field

The present invention relates to speech recognition and machine translation and more particularly to systems and methods for predicting a best performing model or model combination using past "utterance context" information.

2. Description of the Related Art

All automatic speech recognition (ASR) applications including voice-based information retrieval, speech-to-speech translation and spoken dialog systems are sensitive to environmental, speaker, channel and domain mismatch with respect to the training conditions under which the system is trained. This problem is more pronounced when the application is used in real world settings. For example, hand-held speech-to-speech translation systems typically are not used in quiet rooms. The translation systems are used in the street, in a vehicle, etc. where there is a background interference. Moreover, the translation systems may be used by more than one person who may have a different accent, gender, etc.

An ASR task is a sequential process where human-human or human-machine interaction has a structure. More often than not, there is an environment/speaker/channel/topic dependency between consecutive utterances. For example, the topic dependency has been exploited in many spoken dialog systems in the form of a dialog state, or a speaker dependency is exploited in the form of a speaker adaptation.

Model adaptation when it is applicable for ASR is one way of addressing this issue with limited success. The real world speech recognition performance improvements from adaptation hardly match those improvements obtained in an offline controlled experimental setting. A single acoustic model built by multi-style training to account for various acoustic and environmental conditions may be suggested. However, better performance is achieved if multiple acoustic models are trained separately for different conditions (including multi-style training) and a best model is selected during decoding. Moreover, combining the multiple decoding outputs automatically is needed.

Another problem involves a "context independent" use of ROVER (See J. Fiscus, "A Post-Processing System To Yield Reduced Word Error Rates: Recognizer Output Voting Error Reduction", ASRU, 1997, incorporated herein by reference) or consensus based hypothesis combination (CHC) (See L. Mangu, E. Brill and A. Stolcke, "Finding Consensus Among Words: Lattice-Based Word Error Minimization". Eurospeech 1999, incorporated herein by reference) for improved speech recognition accuracy. The CHC method is a well-established and widely used speech recognition hypothesis combination method. It combines multiple speech recognition hypothesis presented in the form of lattices obtained using different acoustic and/or language models.

SUMMARY

Even though the CHC method has been used with success, it has limitations. For example, CHC does not directly address and factor in the reliability of each lattice generated by different methods/models. It treats lattices equally. However, in a scenario described above where the models are radically different (clean/noisy, male/female, adapted) some models outperform others significantly if there is an environment/speaker match. Actually in a speech-to-speech application, the user chooses one of the many recognition alternatives presented, which is an instant feedback regarding the truth. The instant user feedback for alternative hypothesis can be utilized both for model selection and CHC which will be referred to as a "Weighted-CHC" for a next speaker utterance.

A translation method and system include a recognition engine having a plurality of models each being employed to decode a same utterance to provide an output. A model combiner is configured to assign probabilities to each model output and configured to assign weights to the outputs of the plurality of models based on the probabilities to provide a best performing model for the context of the utterance.

A translation method includes recognizing an utterance using a plurality of models each being employed to decode the utterance to provide an output, assigning probabilities to the outputs based on performance, weighting the models based upon the assigned probabilities, predicting a best performing model based on the weighting of the outputs, and determining a combination hypothesis for the best performing model and applying at least one of past performance and user input as feedback to adjust the weights for translating a next utterance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
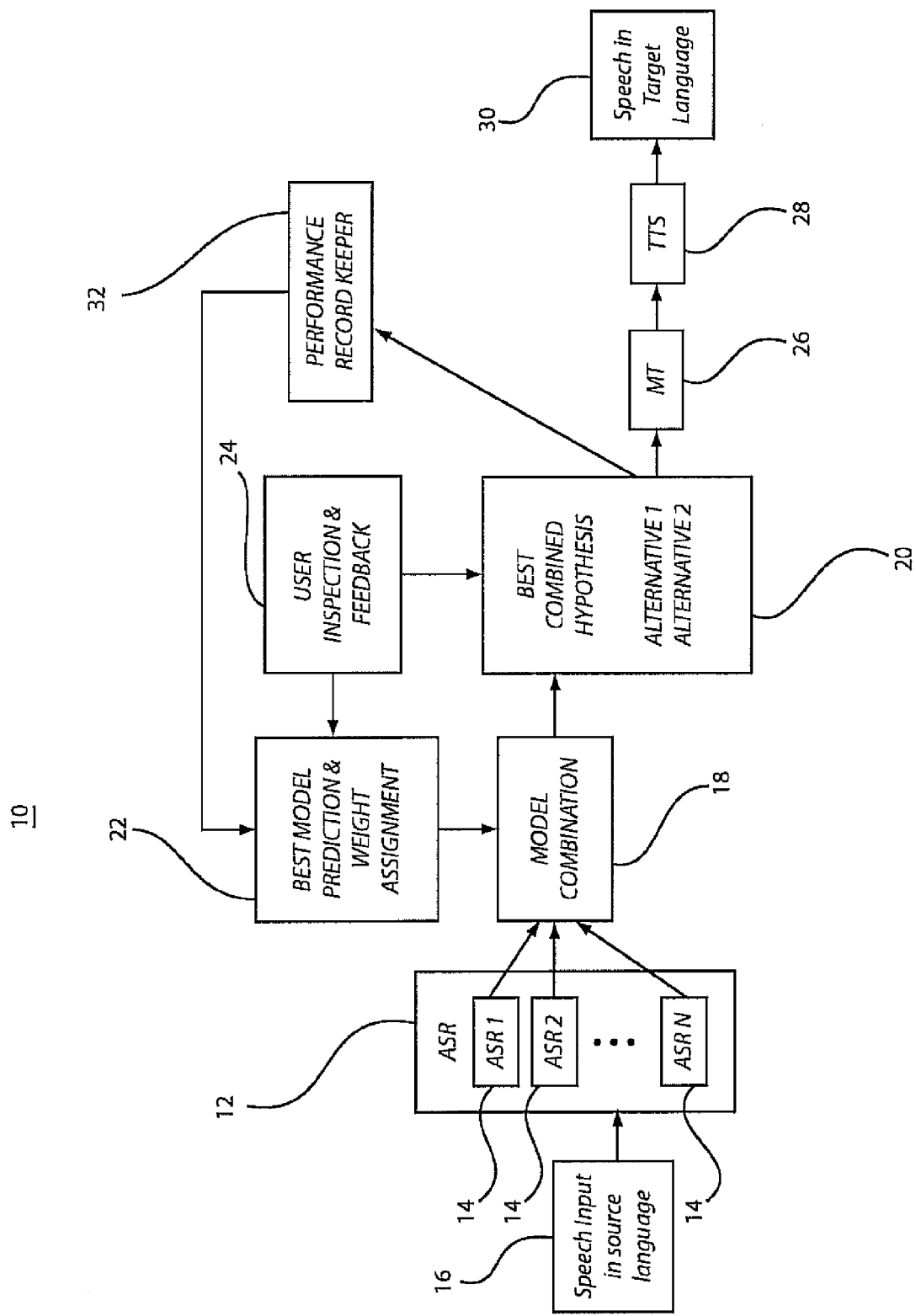
FIG. 1 is a block/flow diagram showing a translation system/method in accordance with the present principles.

In accordance with the present principles, sentence context information (not in its explicit semantic sense) is employed to predict a best performing model or model combination using past sentences. This may be performed in a framework where the prediction model is guaranteed to perform as well as the best linear predictor that sees the entire dialog (future utterances). This prediction model may be referred to as "Universal Prediction" model. A universal predictor assigns probabilities to each model/engine outputs by minimizing a loss function for the prediction of the next best performing model. Consequently, the universal predictor associates a sequential confidence score to each output using the "utterance context". The confidence scores are used to weigh different model outputs to generate the best combined output (the best model).

An optimal model selection and hypothesis combination method guarantees picking a best performing model (or combination of models) and adjusts the hypothesis combination strategy accordingly for recognizing the next user utterance. In this framework, it is assumed that the truth for the previous utterance has been presented. The truth may include direct user feedback.

In other speech to speech systems, the user is provided with alternative recognition and translation hypothesis generated by different models/engines. The user picks the "best" automatic speech recognition (ASR) output, which is fed into multiple machine translation (MT) engines each using a different data/modeling/decoding paradigm. The other user speaking in the target language picks the "best" translation out of many alternatives providing thereby instant feedback about the performances of individual MT engines. This feedback is used to adjust the reliability weights assigned to each MT engine in a hypothesis combination for translating the next utterance.

In case the user is provided with a CHC hypothesis along with the individual ASR outputs and happens to pick the CHC hypothesis as the best ASR output, then the confidence assigned to each engine is defined by factoring the distance (e.g. in the WER/BLEU sense as in known in the art) between CHC hypotheses and the individual ASR outputs.

The selection of the model order (in linear prediction) is one important, but often difficult, aspect of applying linear prediction to a particular application. An appropriate model order for a particular application depends both on the type and length of data over which the model will be applied. On one hand, larger model orders can capture the dynamics of a richer class of signals. On the other hand, larger model orders also require proportionally larger data sets for the parameters to be accurately estimated.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a speech to speech translation architecture or system 10 is shown in accordance with an illustrative embodiment. It should be understood that the architecture may be employed in a plurality of platforms, for example, on a computer, a hand-held translation device, a personal digital assistant, a mobile telephone or any other suitable device.

Architecture or system 10 provides prediction functions as opposed to performing modeling although architecture 10 may be adapted to perform speech/speaker modeling as well. The architecture 10 considers the sequential linear prediction problem from a different perspective than prior art systems. Rather than focusing on selecting a specific model order and a set of parameters based on their relative performance, a method of prediction based on a weighted combination over all possible predictors (models) is employed. The weighted combination of all possible predictors is universal with respect to both parameters and model orders. The performance of this universal predictor is at least as good as the best linear predictor of any model order, even when the parameters are tuned to the data.

Even though the system and method are not limited to linear prediction, linear prediction is considered as a special case. A universal linear prediction system/method is provided in accordance with the present principles that does not fix the order in advance, but rather weights all possible model orders according to their performance to the present point in time. An accumulated loss (error) of this system/method is better, to within a negligible term, than that of an recursive least squares (RLS) predictor whose order was preset to for any less than some M. Since the RLS order outperforms any fixed linear predictor of order M, the present invention attains asymptotically the performance of the best fixed (or sequential) linear predictor of any order less than M. In our derivation, we only assume that the predicted sequence is bounded, but it is otherwise an arbitrary, real-valued sequence.

Speech input 16 in a source language is input to an automatic speech recognition (ASR) device 12 of architecture 10. The speech input signal 16 is preferably an utterance) x(t). In one example, this utterance may be in Iraqi Arabic or any other language. ASR 12 includes a plurality of engines or models 14 adapted to decode the input speech 16. Multiple ASR engines 14, e.g., ASR1, ASR2, . . . ASRN will each produce a transcription of the original utterance, x(t).

These engines/models 14 may be combined in a model combiner 18 in any order using feedback from a best model predictions and weight assignment module 22. The model combination block 18 combines the transcribed outputs from the ASR engines 14 using weights assigned for decoding these outputs. The weights can be employed to provide information for selecting a best model combination for decoding this and/or future utterances. Block 18 receives combination weights and/or model selection information from best model prediction & weight assignment block or prediction module 22. Based on the weights and/or model selection information, either a) the multiple transcribed utterances are combined to give a final output or b) a best one among the N outputs of the ASR engines 14 (and other utterances are sorted as alternatives) is chosen. The combined output from a) can also be selected as the best output or can be sorted as an alternative, as well.

The model combiner 18 assigns weights to the outputs of the plurality of models. These weights can be used to sort each output and/or to combine all these outputs to yield a new (a different output from all the other outputs of the models) output. These new outputs can also be provided to the user with the other outputs from the plurality of models, sorted with the given score.

The sorting of the alternatives and/or combination of multiple outputs are based on the weights assigned to each ASR output 14 using input from the best model prediction and weight assignment block 22.

The sorted alternatives are provided in a best combined hypothesis block 20 with the best alternatives listed, e.g., on top. This list may be inspected by a user 24. After the user inspection 24, if an output of the model, say ASR3 (14), is selected by the user, its weight will be increased in the next turn (since we expect this model to perform well due to utterance context). The selected output is then fed back to machine translation (MT) unit 26 for translation into a target language 30, say, e.g., English or any other target language. A text to speech converter (TTS) 28 may be employed to convert text to speech.

A best hypothesis may be selected by the user 24. The user selection is reported and stored with a performance record keeper 32. This selection may be used to create historic data to be employed in weighting which models to be employed for future utterances.

The present principles solve the model selection and hypothesis combination by exploiting the "utterance context". The problem is formulated as a sequential prediction task. The utterance context and the performance of each competing algorithm on the previously observed data are used to predict the next best performing model and to adjust the hypothesis combination strategy. The ASR model combination 18 is further detailed in FIG. 2.

Figure 2:
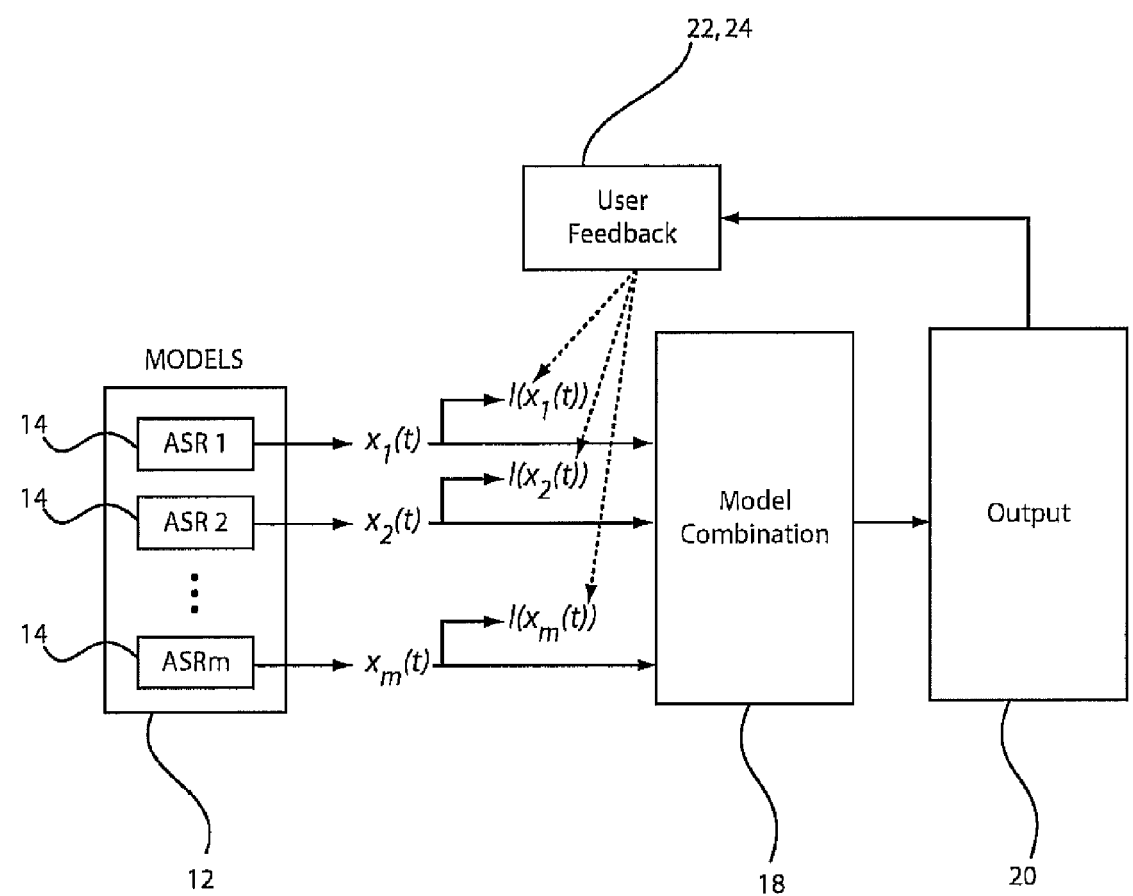
FIG. 2 is a block/flow diagram showing greater detail for a model combiner in accordance with the present principles.

Referring to FIG. 2 with continued reference to FIG. 1, given m (ASR) models 14, at time t (where time t can be a dialog turn or an absolute time), we have m different outputs, $x_1(t), \ldots, x_m(t)$, e.g., each $x_j(t)$ corresponds to a sentence generated by a different ASR 14. A performance measure is defined to assess the success of each constituent model on the task so far, such as the BLEU score or how many times the output of that model is selected by the user. This loss or performance is defined as $l(x_j(t))$. Using this performance measure, we next assign a probability, $P(x_j(t))$ to each model output. This probability assignment may take many forms; however, for this implementation, the assignment includes exponentiated and normalized accumulated loss, e.g., $$P(x_j(t)) = \frac{\exp\left(-c\sum_{i=1}^{t-1} l(x_j(i))\right)}{\sum_{k=1}^{m} \exp\left(-c\sum_{i=1}^{t-1} l(x_k(i))\right)} \quad \text{Eq. (1)}$$

where $j=1,\ldots,m$, and c is a learning parameter that should be chosen depending on the application.

By assigning a probability to each model 14, based on the performance on the data observed so far, we efficiently adapt to the underlying context of the application. Since, each model runs independently, we efficiently exploit the regions where a competing model outperforms other constituent models. By definition of the assigned probability in Equation (1), the best competing model will have the largest probability, hence would be chosen or assigned the largest weight in the combination. The method effectively learns the context from the performances of competing models.

Next, the user is presented with the best hypothesis combination and different alternatives in block 20 ranked based on the assigned probability. As an example of a hypothesis combination, we present a context dependent rover such that the ROVER algorithm is computed based on the probabilities instead of direct counts when there is a tie in the usual ROVER algorithm. The user then makes his/her decision based on the presented outputs. This user decision 24 is feedback to the model combination block 18. This user feedback is used by Equation (1) to calculate the future probabilities assigned to each constituent model.

Although FIG. 1 presents a model combination framework for the ASR outputs, method combination frameworks may also be employed in a more general embodiment. This framework may straightforwardly be extended to machine translation where the MT block 26 may be replaced by several MT units where the outputs of these units would be combined using a similar model combination (18) with feedback as previously described.

When the underlying loss function is defined as the squared error loss or a binary match/unmatch, it can be shown that the system/method in accordance with the present principles performs as well as the best constituent model that could have been chosen in hindsight, i.e., loss of present method $$\approx \min_j \sum_{i=1}^{T} l(x_j(i)).$$

Hence, this approach provides a solution which guarantees the selection of the best performing model as well as any optimal strategy.

In accordance with the present principles, an optimal model selection and hypothesis combination method guarantees the selection of the best performing model and adjusts the hypothesis combination strategy accordingly for recognizing the next user utterance. In this framework, it is assumed that the truth for the previous utterance has been presented. The truth may include direct user feedback.

In other speech to speech systems, the user is provided with alternative recognition and translation hypothesis generated by different models/engines. The user picks the "best" automatic speech recognition (ASR) output, which is fed into multiple machine translation (MT) engines each using a different data/modeling/decoding paradigm. The other user speaking in the target language picks the "best" translation out of many alternatives providing thereby instant feedback about the performances of individual MT engines. This feedback is used to adjust the reliability weights assigned to each MT engine in hypothesis combination for translating the next utterance.

In case the user is provided with a CHC hypothesis along with the individual ASR outputs and happens to pick the CHC hypothesis as the best ASR output, then the confidence assigned to each engine is defined by factoring the distance (e.g. in the WER/BLEU sense as in known in the art) between CHC hypotheses and the individual ASR outputs.

The selection of the model order (in linear prediction) is one important, but often difficult, aspect of applying linear prediction to a particular application. An appropriate model order for a particular application depends both on the type and length of data over which the model will be applied. On one hand, larger model orders can capture the dynamics of a richer class of signals. On the other hand, larger model orders also require proportionally larger data sets for the parameters to be accurately estimated. The present embodiments solve the model selection and hypothesis combination to exploit "utterance context". The problem is formulated as a sequential prediction task where utterance context along with the previous competing model performances are used to predict the next best performing model and adjust to hypothesis combination strategy accordingly. It provides an optimal solution which guarantees selection of the best performing model. It also provides probabilities associated with each output, which can be used to weigh each hypothesis in a combination paradigm (i.e. ROVER, CNC). This invention could also be used in other applications, such as, machine translation and/or classifier combinations.

Previous methods addressing this problem provide limited solutions where individual models are selected based on likelihood, SNR and other criteria without guaranteeing the selection of the best performing model.

Figure 3:
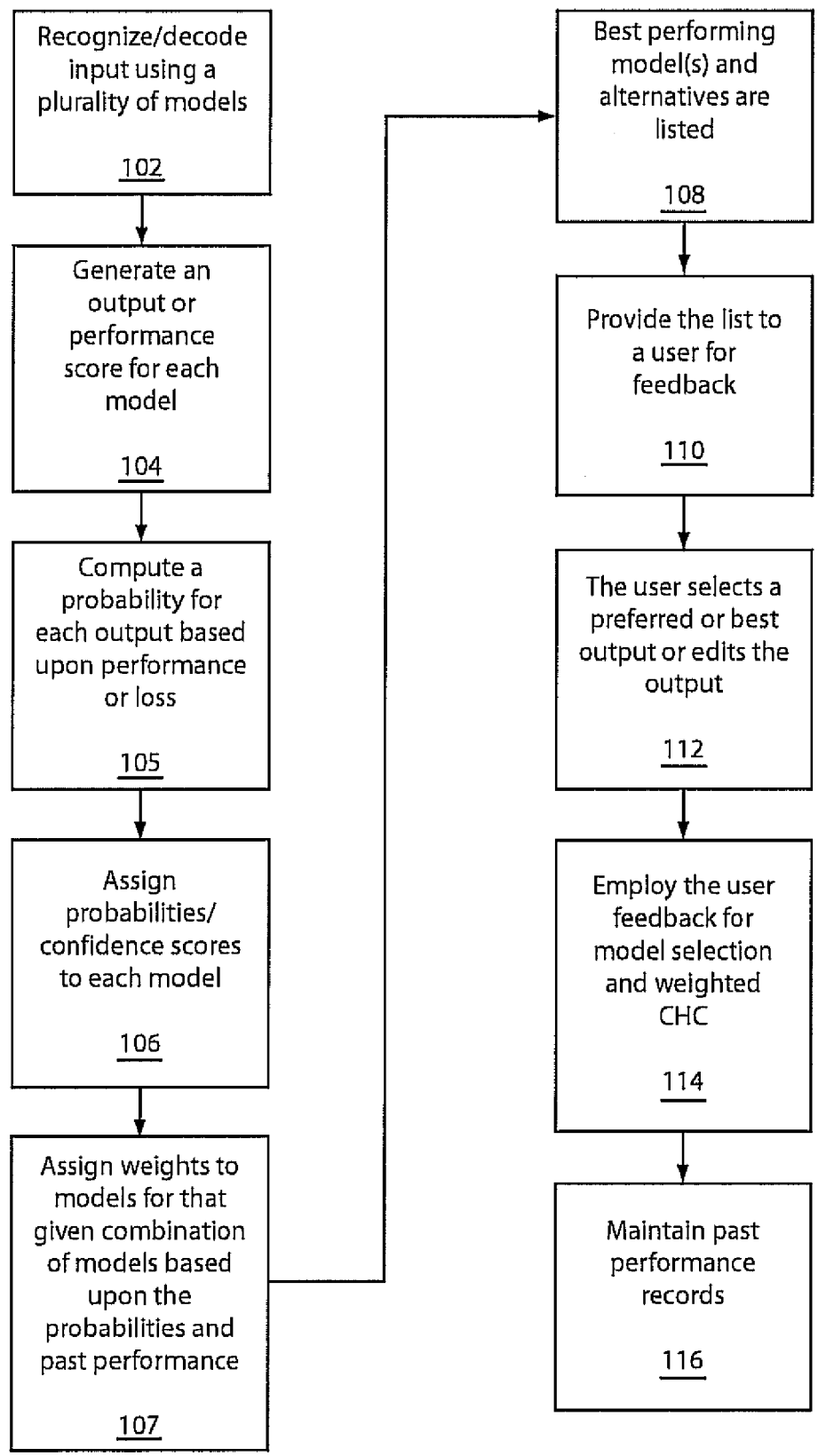
FIG. 3 is a block/flow diagram showing a system/method for translation of speech in accordance with the present principles.

Referring to FIG. 3, a block/flow diagram illustratively shows a system/method for speech to speech translation using "utterance context" information to predict a best performing model using past sentences in a speech-to-speech translation application running on a device. In block 102, speech recognition, machine translation or classifications are performed using a plurality of models and/or classifiers. An output, performance score or loss score is generated for each model/classifier in block 104. A probability is computed for each model's output based upon the performance or loss in block 105. In block 106, probabilities/confidences are assigned to each model. The confidence measure is directly proportional to model performance on the data seen so far and gives relative weights to each model based on their relative success with respect to other algorithms. In block 107, weights are assigned to the models based upon the probabilities/confidences. This weight assignment is independent of the models combined hence there is no additional parameters to learn. The probabilities/confidences and/or the weights may be influenced by past performance and user input.

The best competing model will have the largest probability, hence would be chosen or assigned the largest weight when the models are combined in block 107. Hence, the weights are assigned to the models for a given combination of models based upon the computed probabilities. The method effectively learns the context from the performances of competing models so that having multiple scores for different models produces contextual information for the utterance.

In block 108, a best performing model or combination of models and the alternatives are listed. In block 110, the list is preferably provided to a user for feedback. The feedback from the user can be obtained via a screen or by audio play back on the device employed to perform the translation or decode speech. The translation system provides the best performing model/output or what it believes is the best performing model or output. The best performing model and alternatives may be provided to the user. In block 112, the user can make a selection of the best output (provided by the translator), select one of the alternatives or can edit the best output (or alternative) to correct speech recognition errors. This is the instant user feedback that is available to provide refining of the model combination strategy to improve the ASR performance in a translation system. The instant user feedback for alternative hypothesis can be utilized both for model selection and CEC which may be called a "Weighted-CHC" for a next speaker utterance in block 114.

In block 116, records of all the individual ASR-stream performances are maintained, and the past engine performances are employed to steer the model combination towards the models that performed better in the past for the cases where there is no clear majority in a voting scheme. The voting scheme can be in the form of ROVER or CHC.

Having described preferred embodiments of a system and method for model weighting, selection and hypotheses combination for automatic speech recognition and machine translation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A translation system comprising a computer useable storage medium including a computer readable program, wherein the computer readable program when executed on a computer, comprises:

a recognition engine having a plurality of models each being employed to decode a same utterance to provide an output; and a model combiner, including a probability module configured to compute a probability for each output based on an exponentiated and normalized loss accumulated over time, configured to assign probabilities to each model output and configured to assign weights to the outputs of the plurality of models based on the probabilities to provide a best performing model for the context of the utterance.

2. The system as recited in claim 1, wherein the model combiner outputs a list of alternative hypotheses for user input.

3. The system as recited in claim 2, wherein the user input includes at least one of a user selected output associated with one of the alternative hypotheses and editing information provided by the user.

4. The system as recited in claim 2, further comprising one of a screen and speaker to present the list to obtain user input.

5. The system as recited in claim 1, further comprising a hypothesis combiner configured to select the best performing model and configured to adjust a hypothesis combination strategy in the predictor for recognizing a next utterance based on feedback from at least one of past performance and user input.

6. The system as recited in claim 5, wherein the probabilities are employed to derive a sequential confidence score and the confidence score is adjusted in accordance with the hypothesis combination strategy.

7. The system as recited in claim 5, wherein the user input includes a frequency of selection of a model.

8. The system as recited in claim 1, wherein the probabilities are computed based on a minimized loss determination for each model.

9. The system as recited in claim 8, wherein the weights are determined based upon the assigned probabilities associated with each output.

10. The system as recited in claim 1, wherein the models include one of speech translation models, machine translation models and classifier models.

11. The system as recited in claim 1, wherein the probabilities are calculated as $$P(x_j(t)) = \frac{\exp\left(-c\sum_{i=1}^{t-1} l(x_j(i))\right)}{\sum_{k=1}^{m} \exp\left(-c\sum_{i=1}^{t-1} l(x_k(i))\right)},$$

where $x_j(t)$ is an output of a given model, c is a learning parameter, $l(x_j(i))$ represents the loss of the output, j=1, ..., m, t is the time, and there are m different outputs.

12. A translation method, comprising:
- recognizing an utterance using a plurality of models each being employed to decode the utterance to provide an output;
- assigning probabilities to the outputs based on an exponentiated and normalized loss accumulated over time;
- weighting the models based upon the assigned probabilities;
- using a processor to predict a best performing model based on the weighting of the outputs; and
- determining a combination hypothesis for the best performing model and applying at least one of past performance and user input as feedback to adjust the weights for translating a next utterance.

13. The method as recited in claim 12, wherein the user input includes at least one of selecting an output associated with one of the models and editing information provided by the user.

14. The method as recited in claim 12, further comprising presenting a list of hypotheses to a user to obtain the user input by one of a screen and speaker.

15. The method as recited in claim 12, further comprising deriving a sequential confidence score from the probabilities wherein the confidence score is adjusted in accordance with at least one of past performance and user input as feedback.

16. The method as recited in claim 12, wherein the user input includes a frequency of selection of a model.

17. The method as recited in claim 12, wherein the probabilities are computed based on a minimized loss determination for each model.

18. The method as recited in claim 12, wherein the probabilities are computed based on machine translation models.

19. The method as recited in claim 12, wherein a hypothesis output in accordance with a plurality of machine translation models is presented to a user for feedback.

20. A computer program product comprising a computer useable storage medium including a computer readable program, wherein the computer readable program when executed on a computer causes the computer to perform the steps of:
- recognizing an utterance using a plurality of models each being employed to decode the utterance to provide an output;
- assigning probabilities to the outputs based on an exponentiated and normalized loss accumulated over time;
- weighting the models based upon the assigned probabilities;
- predicting a best performing model based on the weighting of the outputs; and
- determining a combination hypothesis for the best performing model and applying at least one of past performance and user input as feedback to adjust the weights for translating a next utterance.

* * * * *